March 20, 1934.  H. W. KORFHAGE  1,952,030
AUTOMATIC CLOCK WINDING MECHANISM
Filed Oct. 17, 1931   5 Sheets-Sheet 1
FIG. XII.
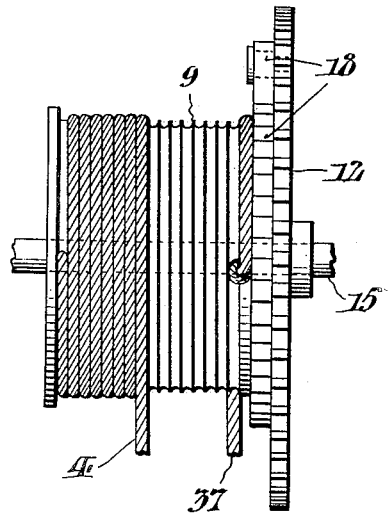
FIG. I.
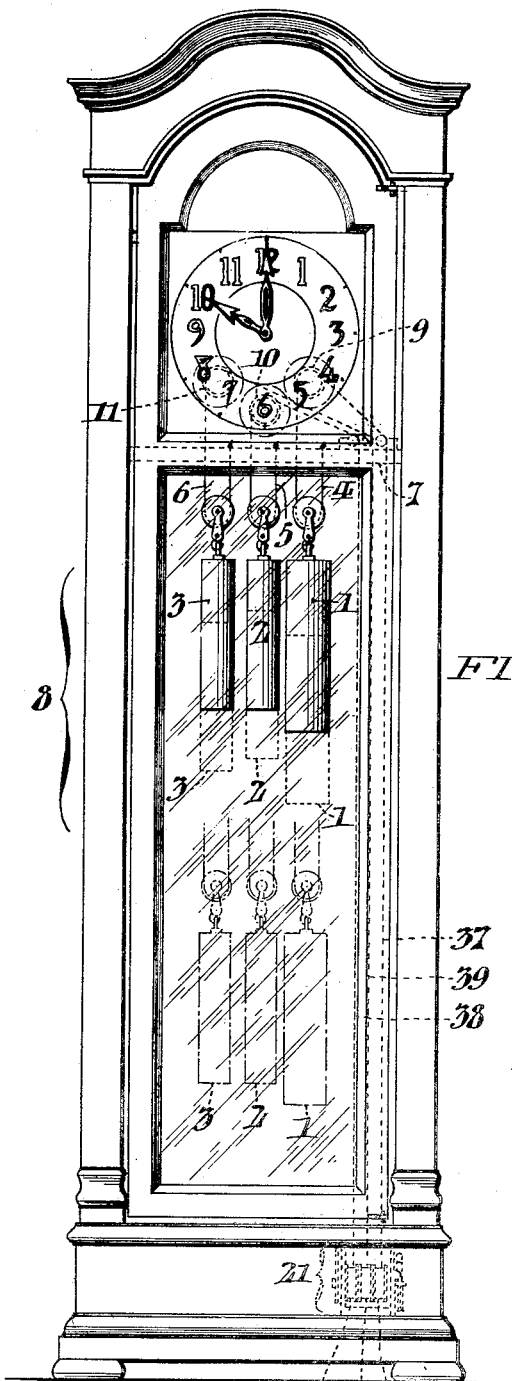
FIG. XI.
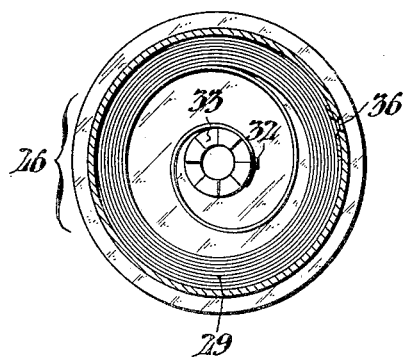
WITNESSES
INVENTOR:
Harry W. Korfhage,
BY
ATTORNEYS.

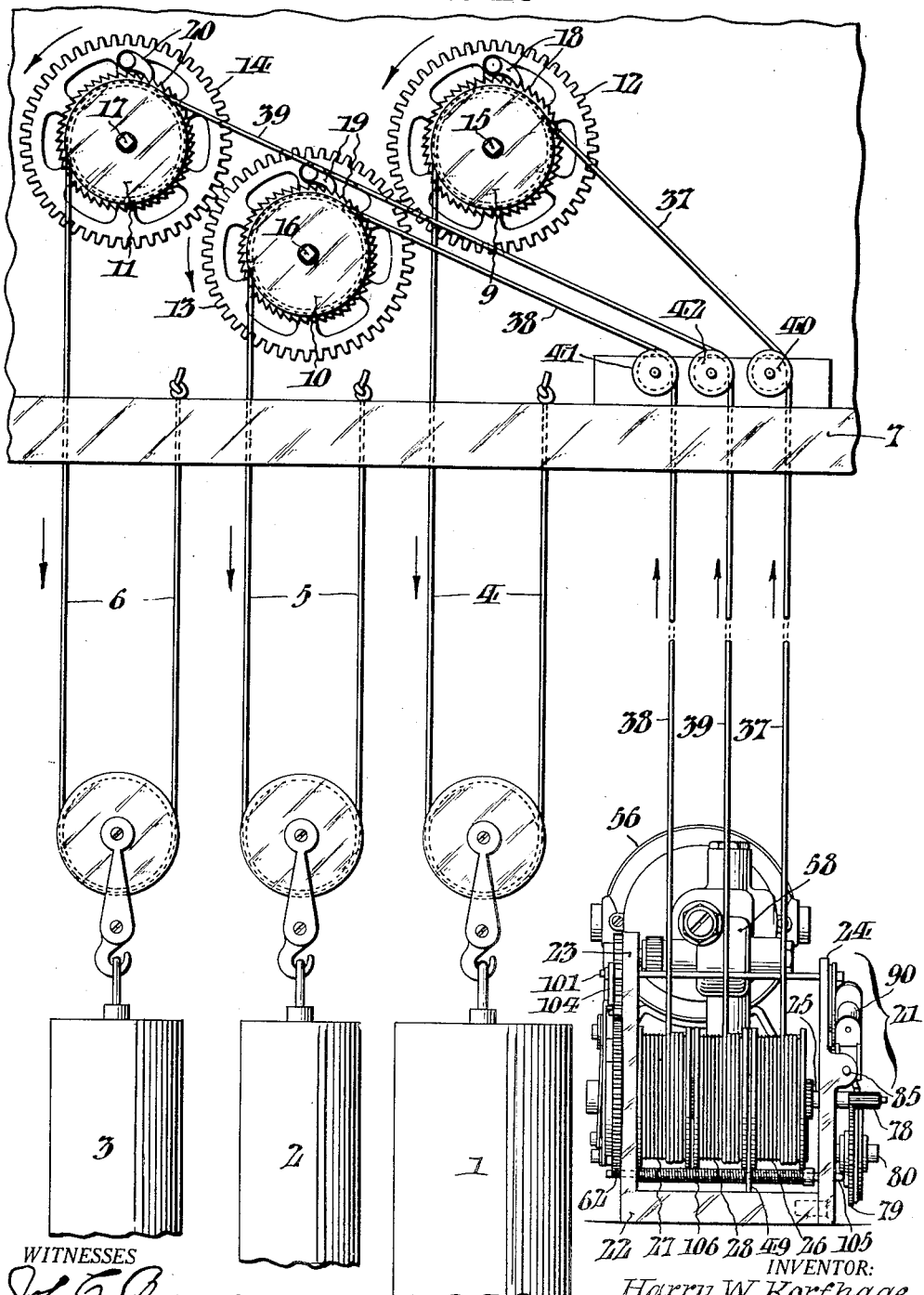

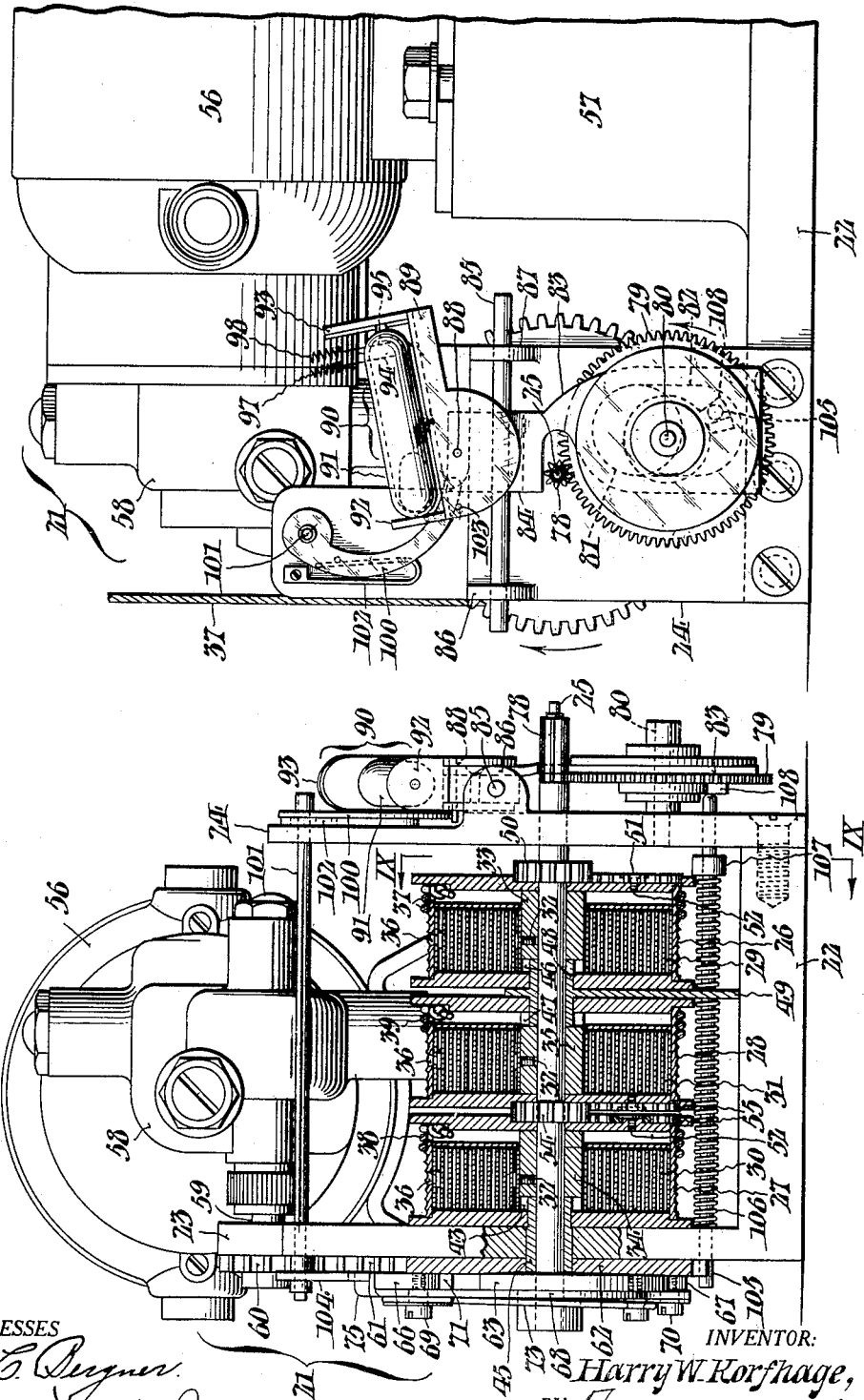

March 20, 1934.   H. W. KORFHAGE   1,952,030
AUTOMATIC CLOCK WINDING MECHANISM
Filed Oct. 17, 1931    5 Sheets-Sheet 4
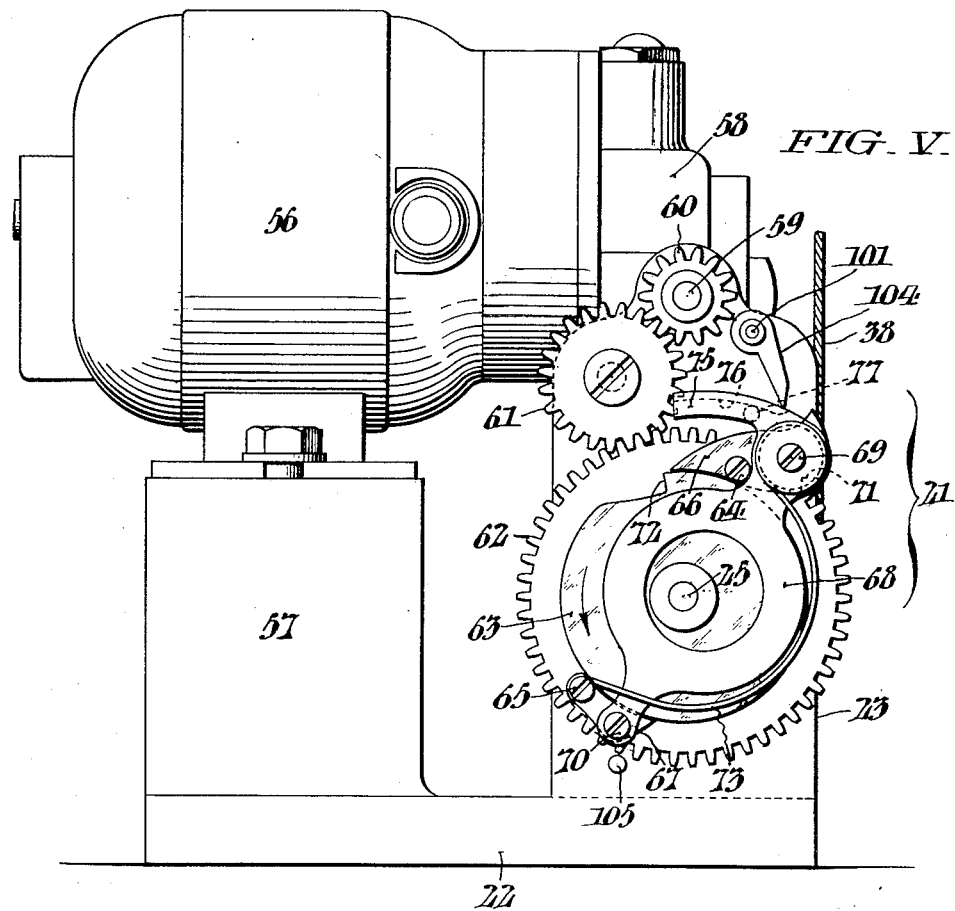
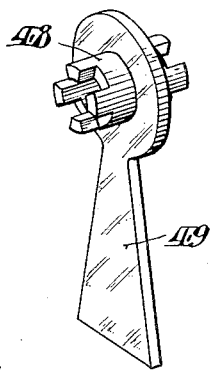
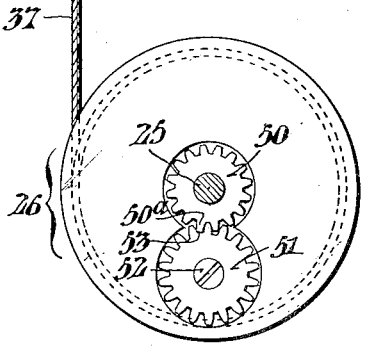
INVENTOR:
Harry W. Korfhage, March 20, 1934.   H. W. KORFHAGE   1,952,030
AUTOMATIC CLOCK WINDING MECHANISM
Filed Oct. 17, 1931   5 Sheets-Sheet 5
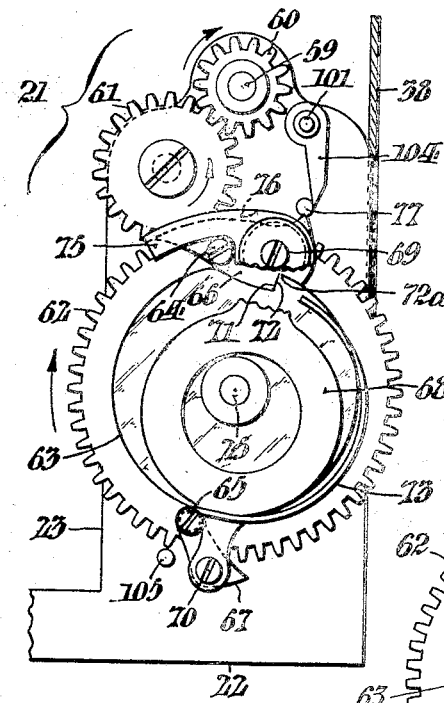
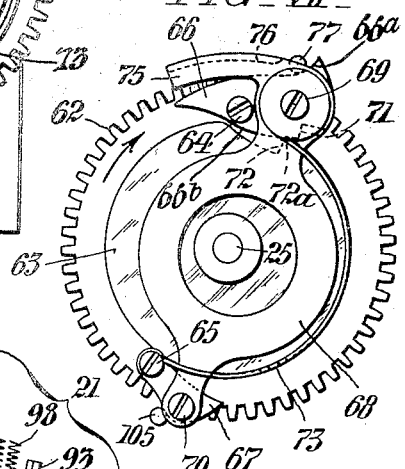
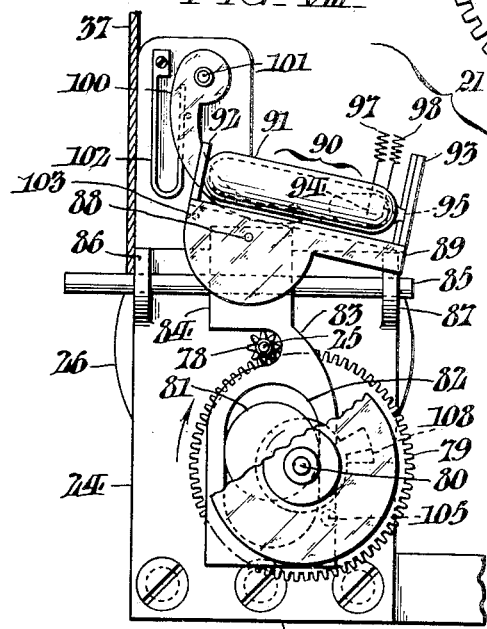
INVENTOR:
Harry W. Korfhage,
BY Frailey Paul
ATTORNEYS.

Patented Mar. 20, 1934

1,952,030

UNITED STATES PATENT OFFICE 1,952,030

AUTOMATIC CLOCK WINDING MECHANISM

Harry W. Korfhage, Collingswood, N. J., assignor to J. E. Caldwell & Company, Philadelphia, Pa., a corporation of Pennsylvania Application October 17, 1931, Serial No. 569,440

15 Claims. (Cl. 58—41)

This invention relates to mechanism for winding clocks, more particularly weight-actuated clocks of the kind commonly known as "grandfather" clocks. While the movements or works of different makes of such clocks may vary considerably in their functioning, they are similar in that they usually embody in them, time mechanism, hour and half hour striking mechanism and chime mechanism; these mechanisms, although coordinated for concerted action, being actuated by separate weights.

Considered in its broadest aspect, my invention is directed toward rendering the operation of such clocks continuous with preclusion of the necessity for hand winding. This desideratum I attain, as hereinafter fully explained, through provision of an electrically-driven winding mechanism, which is simple in design; reliable in action; easy to install; of compact construction so as to be readily accommodated within the casing of the clock; and automatically operative to re-elevate all the clock-actuating weights upon descent of any one of them through a predetermined distance from the starting position or level.

In connection with a winding mechanism having the above attributes, I further aim to make provisions whereby, in the event of failure of the electric current as a consequence of storms or fuse blow-outs, the weights may descend beyond the rewinding level to keep the clock in operation for a prescribed period extending over several days, with the switch controlling the electric motor relied upon to drive the mechanism, maintained closed, and the mechanism in readiness to function upon resumption of the current at any time within the prescribed period aforesaid.

My invention is also directed toward provision of means operative incident to uncoupling of the winding mechanism from the driving motor at the end of a winding cycle, to restrain the re-elevated weights against sudden release while the back lash of the clock works is being absorbed or compensated for, thereby to protect the clock and the winding mechanism against shock and injury.

Another aim of my invention is to insure that the motor control switch is positively held in open position normally to preclude accidental starting of the winding mechanism and possible derangement of the clock works when the clock is shifted from one position to another as in house cleaning.

Still other objects and attendant advantages of this invention will be manifest from the detailed description following in connection with the attached drawings, wherein Fig. I shows a typical "grandfather" clock fitted with an automatic winding mechanism embodying the present improvements.

Fig. II is a diagrammatic view showing how the winding mechanism is connected with the clock movement or works.

Fig. III is a front elevation of the winding mechanism drawn to a larger scale, and with portions thereof in section.

Fig. IV is a fragmentary elevation of the right hand side of the winding mechanism, as considered in Fig. III.

Fig. V shows an elevation of the opposite or left hand side of the winding mechanism.

Figs. VI and VII are views corresponding to Fig. V showing the action of certain parts of the mechanism incident to the performance of a winding cycle.

Fig. VIII is a view corresponding to Fig. IV, likewise showing the action of the mechanism incident to a winding cycle.

Fig. IX is a detail sectional view taken as indicated by the arrows IX—IX in Fig. III, showing one of the supplemental cord drums embodied in the winding mechanism.

Fig. X is a perspective view of one of the parts of the winding mechanism.

Fig. XI shows one of the supplemental cord drums of the winding mechanism in section; and Fig. XII is an elevation of one of the weight cord drums of the clock works, showing the modifications made therein for the purposes of my invention.

The clock which I have chosen for convenience in illustrating my invention is of standard design and construction, having weights 1, 2 and 3 for respectively actuating the time mechanism, the hour striking mechanism, and the chime mechanism incorporated in its works. After common practice, the suspension cords 4, 5 and 6 for the weights 1, 2 and 3, are secured at one end to a fixed cross piece 7 within the housing 8 of the clock, see Figs. I and II; while the other ends of the said cords are made fast respectively to the peripheries of the drums 9, 10 and 11, which, through associated gears 12, 13 and 14 communicate motion respectively to the time mechanism, the hour striking mechanism, and the chime mechanism. The shafts 15, 16 and 17 of the drums 9—11 are squared at one end as shown in Fig. II, for application of a suitable crank handle whereby the clock may be manually wound. Incident to manual winding, as well as to automatic winding in the manner hereinafter described, the drums 9—11 are rotated independently of the associated gear wheels 12—14 through the usual pawl and ratchet couples 18, 19 and 20. For a reason which will presently become obvious I utilize only the halves of the drums 9—11 for taking up the weight cords 4—6.

The automatic winding mechanism constituting the present invention is comprehensively designated by the numeral 21, it being of such size as to be conveniently accommodatable in the lower part of the clock housing 8 as shown in Fig. I. Referring to Figs. II—VII, the mechanism 21 comprises a frame 22 with upright end members 23, 24 which afford bearings for a transverse shaft 25 whereon are freely mounted three supplemental cord drums 26, 27 and 28. Within their hollows, the drums 26, 27 and 28 house spiral tape springs 29, 30 and 31 respectively, the said springs being secured at one end, by means of screws 32, to collars 33, 34 and 35, and at their other ends, by means of rivets 36, to the inner peripheries of the said drums, see Fig. XI. Individual supplemental cords 37, 38 and 39 co-ordinate the drums 26—28 of the automatic winding mechanism with the drums 9—11 of the clock movement. As shown in Fig. III, the lower ends of the supplemental cords are secured to the peripheries of the drums 26—28, and their other ends to the peripheries of the drums 9—11. Enroute between the drums 26—28 of the automatic winding mechanism and the drums 9—11 of the clock movement, the supplemental cords 37—39 are guided about directional pulleys 40, 41 and 42 supported by the cross piece 7 of the clock housing 8. As before stated only halves of the clock work drums 9—11 are utilized for the weight cords 4, 5 and 6, the remaining halves being reserved for the supplemental cords 37—39. Referring to Fig. III, the collar 34 to which the inner end of the spring 30 within the drum 27 is secured, is formed at one end with crown teeth 43 to mesh with like teeth of a bushing 45 which is fixed within an aperture in the upright member 23 of the frame 22, and which affords bearing to the drum shaft 25. In a similar manner, the contiguous ends of the collars 33 and 35 whereto the inner ends of the springs 29 and 30 of the drums 26 and 28 are secured, are formed with crown teeth 46 and 47 to interengage with crown teeth at opposite ends of a stationary sleeve 48 likewise surrounding the drum shaft 25. As shown in Fig. X, the sleeve 48 forms a part of a plate 49 which extends downward between the drums 26 and 28 into contact with the base portion of the frame 22, see Fig. III. By virtue of the described arrangement, the collars 33—35 are obviously held positively against rotating with the shaft 25.

Associated with the drum 26 is an automatic or self-coupling means comprising a pair of differential gear pinions 50 and 51 (Figs. III and IX) whereof the first is secured to the shaft 25 while the second or larger one is free to rotate on an eccentrically-disposed stud let into one side of the said drum. As shown, the pinions 50 and 51 have edge mutilations respectively in the form of an abnormal tooth 50a and in the form of a diminutive notch 53 which, when they register as shown in Fig. IX under conditions later on set forth, positively lock the drum 26 to the shaft 25. The other auxiliary drums 27 and 28 are similarly equipped, i. e., they are respectively provided with pinions 55 like the pinion 51, that mesh in common with a pinion 54, like the pinion 50, fast on the main shaft. The ratio of the pinions 50, 51 and 54, 55 is in the present instance such that, when required for a purpose also later on disclosed, the auxiliary drums 26—28 may rotate independently of each other on the shaft 25.

As a means for driving the automatic winding mechanism, I have shown, at 56, an electric motor which is supported by a pedestal 57 upstanding from the base portion of the frame 22, see Figs. IV and V. The power of the motor is transmitted through a speed reduction unit (not shown) enclosed within an extension housing 58 of the motor frame, to a delivery shaft 59 whereto is secured a spur pinion 60. Through an idler 61, the pinion 60 in turn communicates motion at still more reduced speed to a gear wheel 62 which is free on the projecting end of the bushing 45 and disposed immediately inward of a disk 63 affixed to the left hand end of the drum shaft 25, see Figs. III, V and VI. The speed of the gear wheel 62 is in actual practise about 1 R. P. M. Fulcrumed at diametrically-opposite points to one side of the gear wheel 62 by means of screw studs 64 and 65, are dogs 66 and 67 respectively, the said dogs being pivoted at 69 and 70 to a connecting yoke member 68. Normally the parts just described occupy the positions shown in Fig. V. At 71, the dog 66 is formed with a shoulder, adapted, at certain times, to engage with a circumferential notch 72 in the disk 63 when the yoke member 68 is moved diametrically of the drum shaft 25 under the action of the bow spring designated by the numeral 73, the said bow spring being connected at its ends to the screw studs 65 and 69 respectively carried by the dog 66 and the gear wheel 62. At the end adjacent the stud 69, the yoke 68 is formed with an arcuate wing 75 having a lateral inward cam ledge 76 adapted to be engaged by a fixed stud 77 extending laterally from the side vertical 23 of the frame 22. At its extreme right hand end (Fig. III), the drum shaft is fitted with a small pinion 78 which meshes with a gear wheel 79 mounted for free rotation on a stud 80 projecting laterally from the side upright 24 of the frame 22. Secured to the outer side of the gear wheel 79 is an eccentric cam 81 which engages a vertical elongate aperture 82 in the depending portion 83 of a carriage 84, the latter being secured to a horizontal rod 85 which is slidable endwise in bearing ears 86, 87 afforded by the side member 24 of the frame 22, see Figs. III and IV. Pivoted at 88 to the carriage 84 is a holder 89 in which is secured a mercury tumble switch 90, the tips of the tube 91 of the latter being suitably engaged by clips 92 and 93 afforded by the said holder. The contacts 94, 95 of this tumble switch are connected in circuit with the motor 56 by means of conductors partly shown at 97 and 98 in Fig. IV. Normally, the tumble switch 90 is positively held in the "off" position shown in Fig. IV by means of a curved cam finger 100 affixed to one end of a horizontal rock shaft 101 which has bearing support in the upper part of the frame 22 and which is subject to a leaf spring 102, the said finger engaging a pin 103 on the switch holder 89. At its opposite end the rock shaft 101 has secured to it a detent 104, see Figs. V and VI which normally rests on the top of the arcuate wing 75 of the yoke member 68 hereinbefore mentioned. The detent 104, shaft 101 and cam finger 100 thus constitute a safty means to positively hold the switch normally in "off" position. Accordingly, the clock can be shifted in position without danger of accidental starting of the motor, thereby precluding possible injury to the automatic winding mechanism and the clock works from such cause. The dog 67 also hereinbefore referred to, is adapted to be influenced by a thrust rod 105 which is guided for endwise sliding movement in the uprights 23 and 24 of the frame 22. A helical spring 106, surrounding the thrust rod 105 and in compression between the upright 23 of the frame 22 and a collar 107 on the said rod, tends to maintain the right hand end of the rod in contact with a bevel cam 108, secured to the inside of the gear wheel 79.

The operation of my invention is as follows: Let it be assumed that the weights 1—3 are in the high or starting position shown in full lines in Fig. I, and that the supplemental drums 26—28 are at this time all coupled to the shaft 25 with the differential gear pinions 50, 51 and 54, 55 interlocked. Under the influence of gravity, the weights 1—3 respectively induce rotation of the drums 9—11 in the direction indicated by the arrows in Fig. II, and thereby respectively actuate the time mechanism, the hour striking mechanism, and the chime mechanism embodied in the works of the clock, in the usual manner. With descent of the weights 1—3 and unwinding of their cords 4—6 at different rates from the drums 9—11, the supplemental cords 37—39 are taken up to like extents on the said drums 9—11 concurrently with their withdrawal from the co-ordinated drums 26—28 of the automatic winding mechanism 21. This action takes place with the auxiliary drums 27—29 rotating in the direction of the arrow in Fig. V. Let it be furthermore assumed for the purposes of discussion at this point, that the weight 1 is descending most rapidly with attendant maintenance of the interlock between the differential pinions 50, 51 associated with the corresponding supplemental drum 26. Under these conditions, it is evident that the shaft 25 will be rotated in the direction of the arrow in Fig. IV; while the other two auxiliary drums 27 and 28 will drag under the variant dictates of the corresponding weights 2 and 3 and concurrently rotate idly and independently on the shaft 25 as permitted by the associated differential pinions 54, 55, the supplemental cords 28 and 29 being consistently maintained taut by the volute springs 30 and 31 influential upon the drums 27, 28. The described action exists with attendant rotation of the gear wheel 79 under the drive of the pinion 78, in the direction of the arrow in Fig. IV. Incident to rotation of the gear wheel 79, the attached eccentric cam 81 is moved from the position shown in Fig. IV to that shown in Fig. VIII, and gradually shifts the slide carriage 84 leftward. Through attendant cooperation between the pin 103 and the cam finger 100 (which at this time is held rigid), the tumble switch 90 is permitted to gradually swing, under the influence of gravity, to the "on" position of Fig. VIII to start the motor 56. Also during the same movement of the gear wheel 79, the bevel cam 108 thereon is advanced to the position shown in Fig. VIII, away from the rod 105, which latter is thereupon immediately shifted by the spring 106 whereby its left hand end is withdrawn from beneath the dog 67. All the events just recited occur during substantially two rotations of the drum shaft 25 (corresponding substantially to a day's run of the clock), the weight 1 having descended to about the position indicated in dotted lines in Fig. I, and the weights 2 and 3, for example, to the positions likewise indicated in dotted lines. With the motor 56 now running, motion is communicated to the gear wheel 62 in the direction of the arrow thereon in Fig. VI, with attendant withdrawal of the wing 76 of the attached yoke member 68 from the fixed stud 77. Then, through action of the spring 73, upon the yoke member 68, the dog 66 is pulled down against the circumferential edge of the disk 63. Ultimately, upon reaching the notch 72 in the disk 63, the dog 66 is drawn into the said notch through further influence of the spring 73 upon the yoke member 68 and so positively clutches the gear wheel 62 to the disk as in Fig. VI, whereafter reverse rotation is obviously imparted to the drum shaft 25 as indicated by the arrow in Fig. VI. Being still coupled with the shaft 25 at this stage through continued interlock of the differential pinions 50 and 51, the auxiliary drum 26 is, as a matter of course, in turn reversely rotated to take up on the auxiliary cord 37 with communication of motion to a like degree to the drum 9 of the clock mechanism to lift the weight 1. As reverse rotation of the shaft 25 continues under drive of the motor 56, the differential pinions 55 on the auxiliary drums 27 and 28 eventually re-interlock successively with the intermeshing pinion 54 on the shaft (the order of succession being dependent upon the relative positions of the corresponding weights 2 and 3 at the time of initiation of the winding cycle), whereupon the said drums are rotated likewise under the drive of the motor, to take up on the supplemental cords 38 and 39 thereby to cause the other two clock weights 2 and 3 to be lifted to high or starting position concurrently with lifting of the weight 1. Simultaneously with the events just related, the gear wheel 79 is rotated in the direction of the arrow in Fig. VIII, the bevel cam 108 being thereby returned to the position shown in Fig. IV by the time the weights 1—3 are re-elevated to starting position. Through incidental encounter of the bevel cam 108 with the rod 105, the latter is returned to the normal position shown in Fig. III with its free end in the path of the dog 67 which at this stage of the winding cycle is about to approach the rod as in Fig. VI. Upon contact of the dog 67 with the rod 105 as in Fig. VII, the yoke member 68 is lifted to dislodge the dog 66 from the notch 72 in the disk 63 on the drum shaft. The disk 63 is however not immediately freed, but held in restraint through enforced camming action concurrently between the upwardly curved portion 66a of the upper edge of the dog 66 with the pin 77 and the lower convexed portion 66b of the lower edge of the said dog with the corner 72a of the notch 72 in the disk, under the pressure of the spring 73. As a consequence of the restraint imposed upon the disk 63 as just explained during unclutching thereof from the gear wheel 62, the weights 1, 2 and 3 are prevented from dropping suddenly in taking up the back lash of the clock works, and the latter, as well as the automatic winding mechanism, accordingly protected against shock and injury. As rotation of the gear wheel 62 continues, the cam ledge 76 of the wing 75 of the yoke eventually rides over the stud 77 with attendant complete release of the disk 63 and lifting of the finger 104 by said cam ledge and resultant throwing of the switch 90 instantly to "off" position to interrupt flow of current to the motor 56. During subsequent overrunning of the motor, the gear wheel 62 is rotated somewhat more, but its motion is soon spent carrying the yoke 68 a little further around the ledge 76 riding the stud 77, the parts of the winding mechanism being thereby finally restored to the normal positions shown in Figs. I–IV.

If, at the time that the switch 90 is moved to "on" position upon turning of any one of the supplemental drums through two revolutions, as hereinbefore explained, the electric current should be interrupted by storm or through short circuiting, the clock may continue in operation under the pull of the weights 1—3 until they have fully descended to the positions indicated in dot and dash lines in Fig. I. For this purpose, a leeway of six extra revolutions is in the present instance allowed for in the supplemental drums 26—28, corresponding in time to about three or four days' running of the clock. During this interval, the switch supporting carriage 84 will be moved further toward the left of the finger 100, with the switch 90 maintained all the while in closed position under gravity. Therefore, upon resumption of the electric current supply at any time during the prescribed leeway period aforesaid, the automatic winding mechanism will be instantly set into motion to re-elevate the clock weights in the manner already understood.

Due to independent mounting of the supplemental drums 26—28 on the shaft 25 and as a consequence of the provision of the volute springs 29—30 and the differential gear units 50, 51 and 54, 55, the clock weight drums 9—11 may be individually wound by hand at any time.

It is to be understood that I do not wish to be limited to the precise details of construction and arrangement specifically set forth herein since these may be readily varied to suit different conditions of practice.

Having thus described my invention, I claim:

1. In the combination with a clock having several coordinated mechanisms in its works actuated by separate weights suspended by individual cords from separate drums; winding mechanism including supplemental drums and cords, automatically operative upon descent of any one of the aforesaid weights through a predetermined distance, to perform a winding cycle whereby the cord drum of such weight, as well as the cord drums of all the other weights, are reversely turned and the weights re-elevated to starting position.

2. In the combination with clock works embodying several coordinated mechanisms actuated by separate drums with cord-suspended weights; automatic winding mechanism comprising a plurality of independent supplemental drums respectively coordinated by individual supplemental cords with the clock weight drums, and means selectively operable by the supplemental drums to initiate a winding cycle whereby the clock weights are all re-elevated to starting position after any one of them has rotated through a predetermined number of revolutions under the pull of the corresponding weight.

3. In the combination with clock works embodying several coordinated mechanisms actuated by separate drums with cord-suspended weights; automatic winding mechanism comprising a plurality of drums individually coordinated by supplemental cords with the clock weight drums, a shaft on which said drums are mounted with capacity for independent rotation, self-coupling means to connect the supplemental drum corresponding to that one of the clock weights descending most rapidly, to the shaft, and means operative upon rotation of the shaft through a predetermined number of revolutions under pull of the aforesaid weight, to initiate a winding cycle whereby the shaft is reversely rotated with attendant re-elevation of all the weights to starting position.

4. In the combination with clock works embodying several coordinated mechanisms actuated by separate drums with cord-suspended weights; automatic winding mechanism comprising a plurality of drums individually coordinated by supplemental cords with the clock weight drums, a shaft on which said drums are mounted, volute springs interposed between the shaft and the supplemental drums permitting the latter to independently follow the dictates of the respectively coordinated clock weights while maintaining the supplemental cords taut, self-coupling means to connect the supplemental drum corresponding to that one of the weights descending most rapidly, to the shaft, and means operative upon rotation of the shaft through a predetermined number of revolutions under the pull of the weight aforesaid, to initiate a winding cycle, whereby the shaft is reversely rotated with attendant re-elevation of all the weights to starting position.

5. In the combination with clock works embodying several coordinated mechanisms actuated by separate drums with cord-suspended weights; automatic winding mechanism comprising a plurality of independent drums respectively coordinated by individual cords with the weight drums, a shaft on which said drums are freely mounted, self-releasing coupling means individually associated with the auxiliary drums and adapted to determine connection of the shaft to that one of the said auxiliary drums which is coordinated with the clock weight descending at the fastest rate, while permitting the others of the said auxiliary drums to rotate independently of the shaft in responding to the dictates of the clock weights respectively coordinated with them, and means actuated through rotation of the shaft through a predetermined number of revolutions, to initiate a winding cycle whereby the shaft is reversely rotated, with attendant successive connection of the auxiliary drums thereto, in accordance with the extent of the descent of the corresponding weights, and resultant re-elevation of all of the weights to starting position.

6. In the combination with clock works embodying several coordinated mechanisms actuated by separate drums with cord-suspended weights; automatic winding mechanism comprising a plurality of spring influenced drums respectively coordinated by individual cords with the weight drums, a shaft on which said drums are freely mounted, self-connecting means individually associated with the auxiliary drums and adapted to effect coupling of the shaft to that one of the said auxiliary drums coordinated with the clock weight descending at the fastest rate, while permitting the others of the auxiliary drums to rotate independently on the shaft in responding to the dictates of the clock weights coordinated with them, the said self-connecting coupling means each comprising an eccentrically disposed differential gear pinion carried by the drum in mesh with a smaller pinion fast to the shaft, respectively having edge mutilations, adapted, upon meeting, to lock the corresponding drum to the shaft, and means actuated by rotation of the shaft through a predetermined number of revolutions to initiate a winding cycle, whereby the said shaft is reversely rotated with attendant locking of the auxiliary drums successively thereto in accordance with the extent of the descent of the corresponding clock weights, and resultant re-elevation of all the weights to starting position.

7. In the combination with a clock having actuating means including a drum and a weight suspended by a cord around about said drum;

automatic winding mechanism comprising a supplemental drum, a supplemental coordinating cord with its ends wound respectively on the supplemental and the weight cord drums, and means operative upon rotation of the supplemental drum through a predetermined number of revolutions under pull of the clock actuating weight, to initiate a winding cycle, whereby the supplemental drum is reversely rotated to take up on the supplemental cord, with incidental re-elevation of the clock actuating weight to starting position.

8. In the combination with a clock having actuating means including a drum, and a weight suspended by a cord from the drum; automatic winding mechanism comprising a motor, a supplemental drum, a supplemental cord by which the supplemental drum is coordinated with the clock weight drum, and means operative upon rotation of the supplemental drum through a predetermined number of revolutions under the pull of the clock weight, to couple the supplemental drum with the motor, whereby the supplemental drum is reversely driven and the supplemental cord taken up with incidental re-elevation of the clock weight to starting position.

9. In the combination with a clock having actuating means including a drum, and a weight suspended by a cord from the drum; automatic winding mechanism comprising an electric driving motor, a control switch therefor, a supplemental drum, a supplemental cord, by which the supplemental drum is coordinated with the clock weight drum, and means operative upon free rotation of the supplemental drum through a predetermined number of revolutions under the pull of the clock actuating weight, to close the motor control switch and to clutch the supplemental drum to the said motor, whereby said supplemental drum is reversely driven and the supplemental cord taken up, with incidental re-elevation of the clock weight to starting position.

10. In the combination with a clock having actuating means including a drum and a weight suspended by a cord from the drum; automatic winding mechanism comprising an electric motor, a control switch therefor, a supplemental drum, a supplemental cord by which the supplemental drum is coordinated with the clock weight drum, and means operative upon rotation of the supplemental drum through a predetermined number of revolutions under the pull of the clock actuating weight, to first close the motor controlling switch, and immediately thereafter to couple the supplemental drum with the motor, thereby to cause the supplemental cord to be taken up on the supplemental drum, with incident re-elevation of the clock weight to starting position; and means operative upon accomplishment of the foregoing to disconnect the supplemental drum from the motor and to open the motor control switch.

11. In the combination with a clock actuated by a weight, cord-suspended from a driving drum; automatic winding mechanism comprising a motor, means operative upon descent of the weight through a predetermined distance, to initiate a winding cycle whereby the drum is coupled with the motor and reversely driven to re-elevate the weight to starting position, and means operative upon subsequent uncoupling of the drum from the motor at the completion of the winding cycle, to temporarily restrain the drum and the weight while the back lash of the clock works is compensated for, with attendant prevention of injury to the clock works and the winding mechanism.

12. In the combination with a clock actuated by a weight, cord-suspended from a driving drum; automatic winding mechanism comprising a motor, clutch means operative upon descent of the weight through a predetermined distance to couple the drum with the motor whereby the drum is reversely driven to effect re-elevation of the weight to starting position, means operative at the completion of the winding cycle to actuate the clutch, thereby to uncouple the drum from the motor, and means embodied in the clutch means to temporarily restrain the drum and the weight while the back lash of the clock works is being compensated for, thereby to prevent injury to the clock works and the winding mechanism.

13. In the combination with a clock actuated by a weight, cord-suspended from a driving drum; automatic winding mechanism comprising a motor, a supplemental drum, a supplemental cord by which the supplemental drum is coordinated with the clock actuating drum, means operative upon rotation of the supplemental drum under pull of the weight through a predetermined number of revolutions, to initiate a winding cycle whereby the supplemental drum is coupled with the motor and reversely driven to re-elevate the weight to starting position, and means operative upon subsequent uncoupling of the supplemental drum from the motor to temporarily restrain the said drum and the weight while the back lash of the clock works is being compensated for, thereby to prevent injury to the clock works and the winding mechanism.

14. In the combination with a clock actuated by a weight, cord-suspended from a driving drum; automatic winding mechanism comprising an electric motor, a gravity-influenced pivoted switch to control the motor, means for positively holding the switch normally in open position, means operative upon descent of the weight through a predetermined distance to effect release of the switch and starting of the motor, and to couple the drum with said motor for reverse driving of the drum to re-elevate the weight to starting position, and means operative upon accomplishment of the foregoing to uncouple the drum from the motor, and to actuate the switch holding means for swinging of the switch to open position.

15. In the combination with a clock having actuating means including a drum, and a weight suspended by a cord from the drum; automatic winding mechanism comprising an electric motor with a control switch therefor; and means operative upon descent of the clock weight through a predetermined distance to close the switch and to couple the drum to the motor for re-elevation of the weight to starting position, and also operative incident to further descent of the weight below the winding level, in the event of failure of the current to the motor, to maintain the switch in closed position in readiness for the performance of a winding cycle by the winding mechanism immediately upon resumption of the current.

HARRY W. KORFHAGE.